July 3, 1962
J. W. KELSO
3,042,429
THREADED WELL CASING JOINT HAVING
COMPRESSIVE LOADING MEANS
Filed Oct. 30, 1959
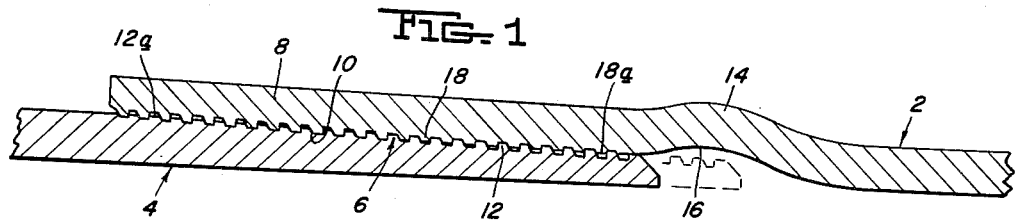
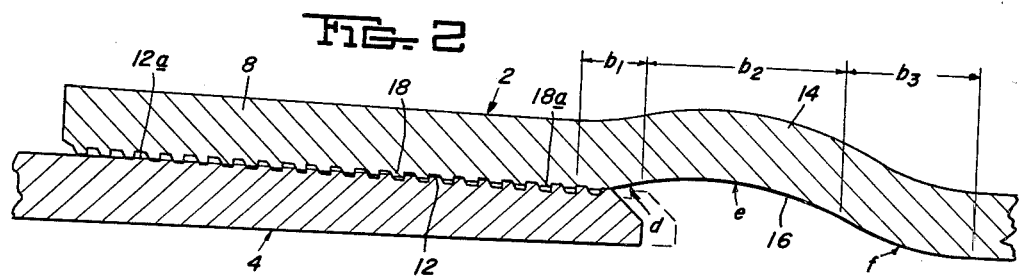
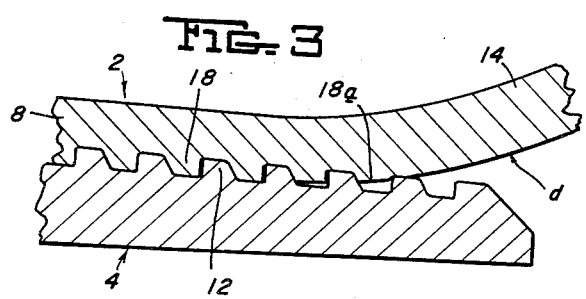
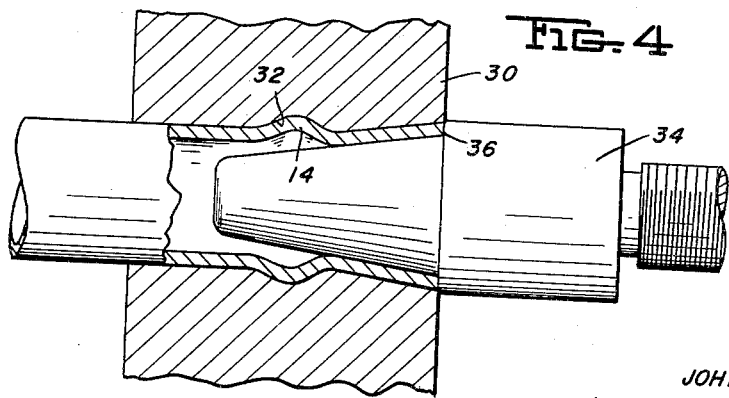
INVENTOR
JOHN W. KELSO
By Donald G. Dalton
Attorney

United States Patent Office 3,042,429
Patented July 3, 1962

3,042,429
THREADED WELL CASING JOINT HAVING COMPRESSIVE LOADING MEANS
John W. Kelso, Dravosburg, Pa., assignor to United States Steel Corporation, a corporation of New Jersey
Filed Oct. 30, 1959, Ser. No. 849,892
1 Claim. (Cl. 285—334)

This invention relates to improvements in integral well casing joints and more particularly to an improved integral threaded joint for well casing which does not require upsetting of the pipe ends embodying buttress-type threads.

Integral joints for well casing and the like are desirable for the reason that only one internal and one external thread is required per joint. However, such joints have not heretofore been used on non-upset casing because of the lack of strength and tendency to leak.

It is accordingly an object of this invention to provide a non-upset insert-type threaded joint having an improved strength and leak resistance.

It is another object of this invention to provide a non-upset insert-type threaded joint embodying buttress type threads having a double "run-out."

The foregoing and further objects will be apparent from the following specification when read in conjunction with the attached drawing, wherein:

FIGURE 1 is a sectional view of an insert type threaded joint embodying my invention;

FIGURES 2 and 3 are enlarged details thereof; and

FIGURE 4 is a side view of a suitable forming tool.

Referring more particularly to the drawing, the numeral 2 designates a section of casing joined to another section of casing 4 by an insert type threaded joint 6. In order to accomplish such a joint, the casing 2 has an enlarged or "belled" end portion 8 which is interiorly screw threaded as at 10 to receive matching threads 12 on the end of the casing section 4.

Preferably the threads are of the acme or buttress type in order to achieve maximum "pull-out" strength of the joint. This results from the load bearing flanks being sufficiently steep so that there is no tendency for the threads to climb under load.

In accordance with the teaching of my invention, the threads 12 of the externally threaded member are provided with a "run-out" 12a. That is both the crests and the roots progress along cones that define them until they intersect the outside diameter of the pipe. All of the threads thereof are held in compression by the threads of the internally threaded member.

The belled end 8 of the internally threaded member is provided with a bulge 14 near the inner end of the threaded portion providing an inner relief cavity 16. This permits the internal threads 18 to likewise "run-out" or vanish at their inner end 18a without changing the slope of the major or minor cones thereof. As a result the outer end of the externally threaded section may be screwed past these vanishing internal threads, thereby placing them in compression and eliminating any notch effect. The shape of the flare or bulge is such that tension on the joint tends to straighten it and intensify the compression force on the internally threaded member.

The internal and external threads are so designed that the external threads may be screwed over the internal threads "hand tight" until the first perfect external thread is in engagement with the inner or last perfect thread adjacent the relief cavity in the expanded member.

As shown in FIGURE 2, the bulge or cavity portion may be considered as comprised of three sections $d$, $e$ and $f$ having lengths $b_1$, $b_2$, and $b_3$, respectively. The $b_1$ section provides a receding profile that permits the internal thread to run out in such a manner that all roots in the vanishing thread are held in compression by the crests of the threads on the externally threaded member when the latter is screwed forward by power make-up.

The $b_2$ section provides a cavity into which the externally threaded end may be screwed without contact with the unthreaded inside surface of the expanded member and increases the root and crest pressure between the external and internal threads when the joint is placed in tension. The $b_3$ section joins the bulge with the normal pipe wall.

As shown in FIGURE 4, the bulge 14 may conveniently be formed by confining the pipe end in a split die member 30 which has a recess or concave portion 32. The pipe may then be expanded into the recess to form the bulge by a mandrel member 34 which is applied against the pipe end as at 36.

While I have shown and described one specific embodiment of my inventon, it will be understood that this embodiment is merely for the purpose of illustration and description and that various other forms may be devised within the scope of my invention, as defined in the appended claim.

I claim:

An integral non-upset well casing threaded joint comprising an internally threaded belled end portion and an externally threaded portion adapted to be screw threadedly connected thereto, a bulge in said belled portion providing an annular internally opening concave portion axially spaced from the end of said belled end portion and adjacent the end of the internal threads, said bulge protruding on the exterior of said belled end portion and having a wall thickness substantially the same as the remainder of the well casing, each of said threaded portions having a run-out at its inner end, said bulge permitting the outer end of said external threads to be advanced beyond the inner end of the internal threads and underlying the bulge whereby when the joint is placed in tension the bulged portion tends to straighten out thereby forcing the internal surface of said bulge into contact with said underlying threads and placing them in compression.

References Cited in the file of this patent

FOREIGN PATENTS

| | | |
|---|---|---|
| 692,061 | Germany | June 11, 1940 |
| 678,613 | Great Britain | Sept. 3, 1952 |